June 7, 1927.
W. W. WELLMAN
1,631,714
LOCOMOTIVE FEED PUMP GAUGE
Filed Sept. 8, 1926
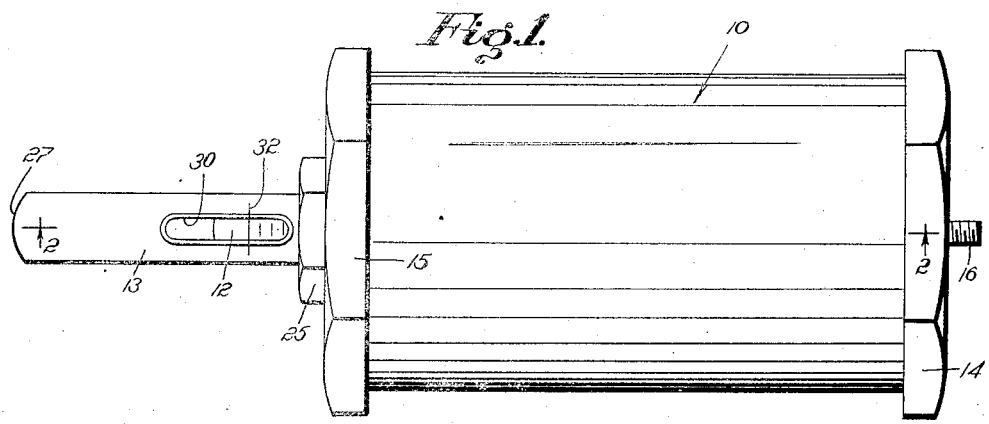
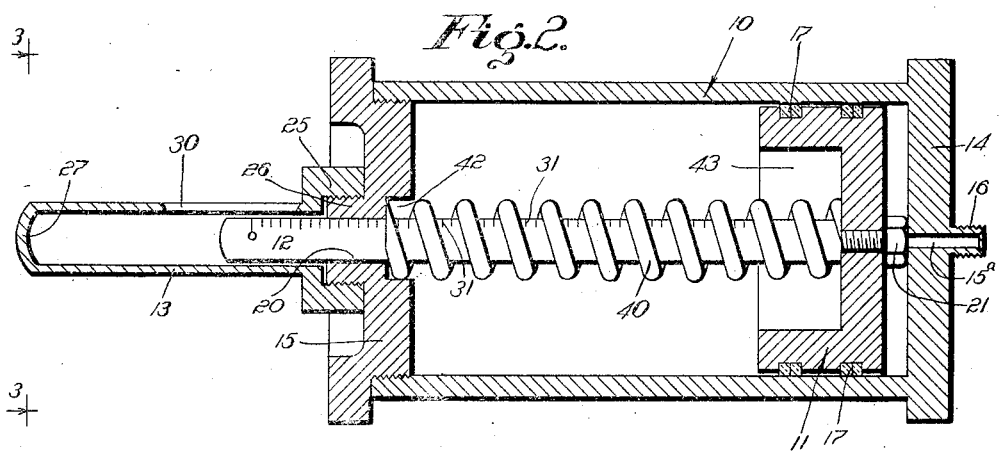
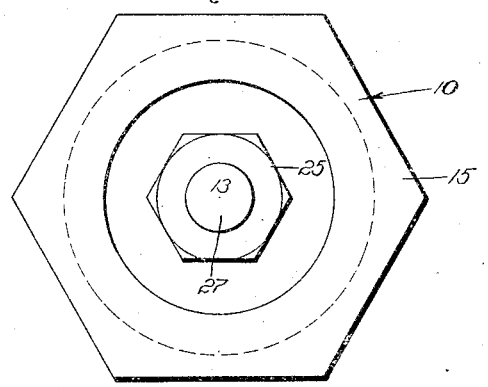
Inventor
William W. Wellman
by
Attorney Patented June 7, 1927.

1,631,714

UNITED STATES PATENT OFFICE.

WILLIAM W. WELLMAN, OF LAS VEGAS, NEVADA.

LOCOMOTIVE-FEED-PUMP GAUGE.

Application filed September 8, 1926. Serial No. 134,319.

This invention has to do with a locomotive feed pump gauge and it is an object of the present invention to provide a practical, effective and durable device of this character.

Various types of locomotives are equipped with feed water pumps which operate to feed fresh water and condensate from the exaust steam to the boiler. These pumps are steam driven and their operation is a very important factor in the operation of the entire locomotive. With the feed pumps used in practice it is necessary to provide means for determining whether or not the pump is properly handling the feed water, as the mere fact that the pump is running does not definitely indicate that it is supplying feed to the boiler. It is customary to provide a pressure gauge in the cab of a locomotive connected with the feed water pump with a view of enabling the engineer to observe the pressure being delivered by the pump. In practice, considerable trouble has been experienced with the gauges that have been provided for this purpose, due mainly to the fact that they are subject to a great deal of jarring and vibration and it has been found difficult to obtain readings from the gauges used, due to the vibration of the indicating hand. The severe vibration to which these gauges are subject causes the delicate parts in them to fail and frequently it is the cause of the indicating hand vibrating so that it is practically impossible to obtain an accurate reading.

It is an object of my present invention to provide a gauge for a locomotive feed water pump which will operate to indicate the pressure at which the pump is operating without excessive vibration or movement of the indicating part of the gauge.

It is another object of my invention to provide a gauge of the character mentioned which is of simple, practical and durable construction and which will effectively withstand the jarring and vibration under which a gauge of this kind must operate.

It is another object of my invention to provide a gauge of the character mentioned which is of simple, inexpensive construction, and which can be easily and quickly cleaned and repaired.

The various objects and features of my present invention will be best and more fully understood from the following detailed description of a typical preferred form of the invention, throughout which description reference is had to the accompanying drawings, in which:

Fig. 1, is a face or front elevation of the gauge provided by this invention.

Fig. 2, is a detailed sectional view of the gauge taken as indicated by line 2—2 on Fig. 1.

Fig. 3, is an end elevation of the gauge, being a view taken as indicated by line 3—3 of Fig. 2.

The device provided by my invention includes, generally, a cylinder 10, a piston 11 operable in the cylinder, an indicating stem 12 operatively connected with piston, and a housing 13 which the stem operates.

The cylinder 10 is closed at one end by a head 14, and at the other end by a detachable cap 15. The head 14 is preferably formed integral with the main or cylindrical portion of the cylinder and is provided with a pressure inlet opening 15$^a$ and a screw threaded projection 16 through which the opening extends. The projection 16 is screw threaded to receive a fitting by which the gauge is connected with a pressure line from the feed water pump. In accordance with the preferred construction the periphery of the head 14 is made polygonal or is provided with flat parts to receive a wrench or other suitable tool.

The cap 15 which closes the other end of the cylinder is made detachable for the purpose of allowing the piston 11 and stem 12 to be arranged in and removed from the cylinder when necessary. The cap is preferably screw threaded to the cylinder, for instance, into the end of the cylinder, and its periphery is preferably made polygonal or with flat parts to receive a wrench or suitable tool.

The piston 11 is slidably carried in the cylinder and carries spaced packing rings 17 which operate to maintain a fluid tight fit between the piston and cylinder.

The stem 12 which is the indicating part of the gauge is attached directly to the piston 11 and extends through an opening 20 in the cap 15 so that it projects from the cap. The stem is preferably round in cross section and made to slidably fit the opening 20. In practice I may provide any suitable connection between the stem and piston, for instance, I may arrange a reduced part on the end of the stem through an opening in the piston and apply a nut 21 to said part in the manner illustrated in Fig. 2.

The housing 13, is applied to or carried by the cap 15 to project outwardly therefrom concentric with the opening 20 to receive the stem 12. The housing may be in the form of a tube provided at the inner end with an enlarged internal screw threaded part 25 adapted to screw thread onto a projection 26 formed on the outer side of the cap 15 concentric with the opening 20. The outer end of the housing is preferably closed by an end wall 27. In accordance with my invention I provide sight opening 30, in the housing whereby the position of the stem in the housing can be observed. The stem 12 is preferably provided along its length with suitable graduations 31 and the housing is provided with a reference mark 32 at the sight opening to cooperate with the graduations 31 so that readings can be obtained showing the position of the stem in the housing.

A spring 40 is provided in the cylinder between the piston 11 and cap 12 to normally urge the piston in the direction of the head 14. The spring 40 is preferably a helical spring carried on the stem 12. I provide recesses 42 and 43 in the cap 15 and piston 11 respectively to receive the ends of the spring.

In operation the gauge is arranged in the cab of a locomotive and the proper connection is made between the feed water pump and the gauge through a suitable pressure line. The pressure line is connected with the projections 16 so that pressure is admitted from the pump to the head end of the cylinder through the opening 15ª. The pressure thus admitted to the cylinder moves the piston away from the head 14 against the resistance of the spring 40 and thereby causes operation of the stem 12 through the housing. Various amounts of pressure admitted into the head end of the cylinder will move the piston to various positions in the cylinder. The engineer can readily obtain the pressure by observing the relationing of the graduations 31 with reference to the mark 32. The packing rings 17 carried by the piston fit the cylinder closely so that they offer resistance to movement of the piston in the cylinder and thereby act as a check which prevents vibration or chattering of the indicating stem. It will be obvious that by providing a suitable fit between the packing and cylinder the desired resistance can be obtained so that the gauge works satisfactorily under the operating conditions encountered. Further, it is to be understood that the device can be made of a size to properly operate under the conditions encountered.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. A locomotive feed water pump gauge including, a cylinder having a head closing one end and a cap closing the other end, there being an opening at the head end of the cylinder to admit pressure from the pump, a piston slidably carried in the cylinder, a spring normally holding the piston at the head end of the cylinder, and means at the cap end of the cylinder to indicate the position of the piston in the cylinder, said means including a stem projecting from the piston through the cap and a tubular housing carried by the cap to receive the stem, the stem being graduated and the housing having a sight opening so that the graduations can be seen.

2. A locomotive feed water pump gauge including, a cylinder, a head integral with the cylinder and closing one end of the cylinder, the head having an opening to admit pressure to the cylinder from the pump, a cap screw threaded to the other end of the cylinder and having a screw threaded projection on its outer side, a piston in the cylinder, rings carried by the piston to make fluid tight connection with the cylinder and to offer resistance to movement of the piston in the cylinder, a stem carried by the piston and projecting through the cap, the stem having graduations on it, a housing carried by the projection and receiving the stem, the housing having a sight opening so that the graduations on the stem can be seen, and a spring carried on the stem between the piston and cap to normally hold the piston at the head end of the cylinder.

In witness that I claim the foregoing I have hereunto subscribed my name this first day of Sept. 1926.

WILLIAM W. WELLMAN.